United States Patent [19]

Zahid

[11] 3,960,179

[45] June 1, 1976

[54] REPAIRABLE PRESSSURE VESSELS

[75] Inventor: Abduz Zahid, Los Angeles, Calif.

[73] Assignee: Greer Hydraulics, Inc., Los Angeles, Calif.

[22] Filed: Apr. 14, 1975

[21] Appl. No.: 567,644

[52] U.S. Cl. .............................. 138/30; 138/26; 138/31
[51] Int. Cl.² ...................................... F16L 55/04
[58] Field of Search ........................... 138/26–28, 138/30, 31, 89

[56] References Cited
UNITED STATES PATENTS

| | | | |
|---|---|---|---|
| 2,278,688 | 4/1942 | Caminez | 138/30 |
| 3,695,298 | 10/1972 | Zahid | 138/30 |

Primary Examiner—Richard E. Aegerter
Assistant Examiner—Larry Jones
Attorney, Agent, or Firm—Arthur B. Colvin

[57] ABSTRACT

This invention relates to the art of Pressure Vessels, more particularly of the type using a deformable bladder having a cylindrical mouth of relatively large diameter with a thickened rim in which is bonded a rigid annular retaining member, the outer periphery of which extends radially outward beyond the periphery of the thickened rim, said retaining member having an annular groove in its outer perihery in which an O-ring is positioned to define a seal with respect to the side wall of the container in which the bladder is positioned, a portion of the thickened rim extending longitudinally beyond the outer surface of the annular retaining member and conformed to define an O-ring with respect to the closure plug of the pressure vessel which is secured in the mouth thereof.

4 Claims, 4 Drawing Figures

REPAIRABLE PRESSSURE VESSELS

As conducive to an understanding of the invention, it is to be noted that where a pressure vessel of the above type has a rigid cylindrical shell or container in which a metal retaining member is positioned, that is secured in fixed position adjacent one end of the container and a deformable partition such as a bladder of resilient stretchable material illustratively of synthetic rubber is positioned in said container with the periphery or mouth of the bladder secured to the retaining member, unless a dependable seal is formed between the periphery or mouth of the bladder and the retaining member and the adjacent container wall, leakage will occur with resultant failure of the unit.

Where the retaining member is secured to the container as by fusing or welding, although a dependable seal will be effected, it is apparent that in the event of failure of the bladder, it cannot be readily removed without first opening the fused or welded connection.

Where the retaining member is removably positioned in the container, and in order to provide a seal, the outer diameter of the mouth of the bladder is made sufficiently large so that it will press tightly against the inner wall of the container, due to the manufacturing tolerances in the inner diameter of the container and the outer diameter of the mouth of the bladder, either too much space is provided between the inner surface of the container and the outer periphery of the bladder so that leakage may occur or too little space is provided with the result that when the retaining member with the bladder secured thereto is inserted into the mouth of the container, the periphery of the bladder may be deformed sufficiently to result in tearing thereof with resultant failure of the unit.

Where, to solve such problem, a construction such as that shown in U.S. Pat. No. 3,695,298 is provided, in which the mouth of the bladder is secured to an annular supporting member of rigid material which has an outer diameter greater than the outer diameter of the periphery of the mouth of the bladder to permit ready insertion of the supporting member and associated bladder into the container mouth so that the outer periphery of the annular supporting member can seat on a shoulder in the bladder and an O-ring is provided in the outer periphery of the annular supporting member to define a seal with respect to the inner surface of the container and a second O-ring is provided in the closure plate or disc secured in the mouth of the container so that seals will be provided for the gas chamber and oil chamber of the container, additional thickness must be provided in the closure disc to accommodate the annular O-ring positioned therein with resultant increase in cost of materials and in addition the cost of the additional O-ring also adds to the overall cost of the unit and furthermore increases the assembly time thereof.

Since units of the above type are intended for high volume production, cost is an important consideration.

It is accordingly among the objects of the invention to provide a pressure vessel of the above type which may readily be fabricated at relatively low cost and which may readily be disassembled for removal of a defective bladder and readily reassembled with assurance that dependable seals will be provided to prevent leakage of gas and oil in the container to the exterior thereof or from the gas chamber into the oil chamber and vice versa.

According to the invention these objects are accomplished by the arrangement and combination of elements hereinafter described and more particularly recited in the claims.

In the accompanying drawings in which are shown one of various possible embodiments of the several features of the invention;

Figure 1:
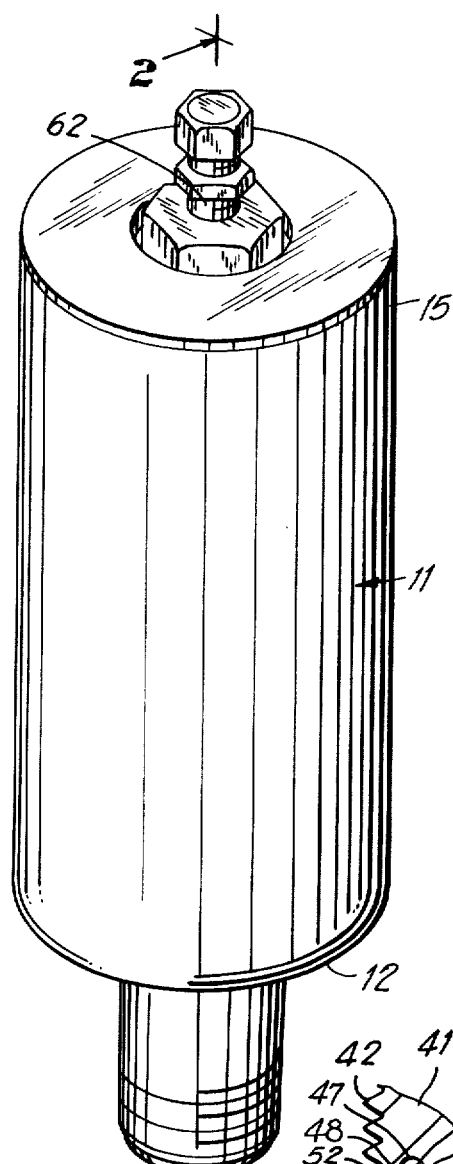
FIG. 1 is a perspective view of a pressure vessel according to the invention.
Figure 2:
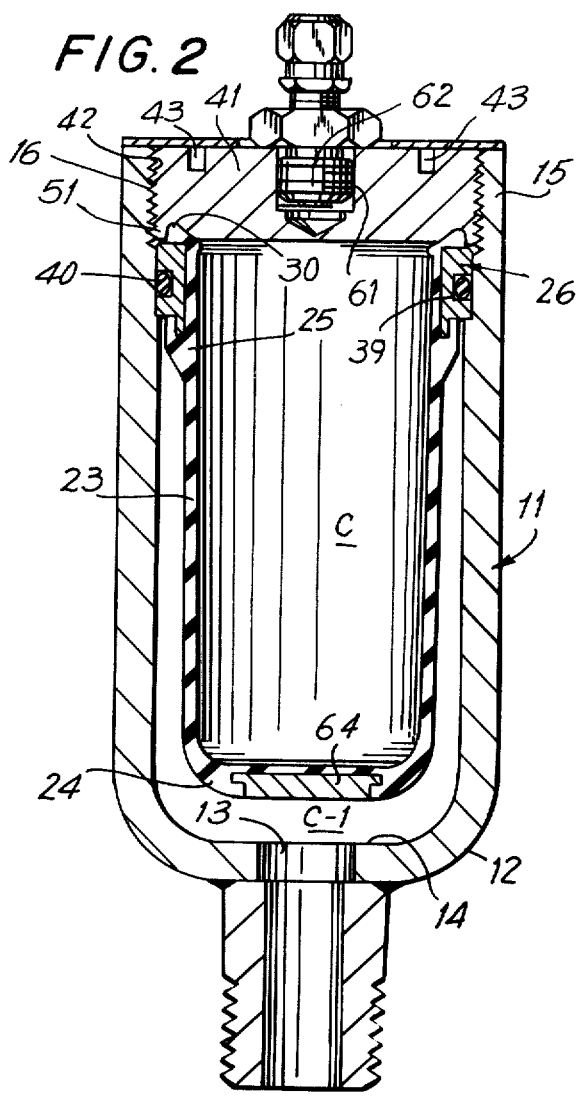
FIG. 2 is a longitudinal sectional view taken along line 2—2 of FIG. 1.

Referring now to the drawings, the pressure vessel illustratively comprises a substantially cylindrical container 11 of rigid material such as steel or aluminum capable of withstanding the pressure to which it is to be subjected in use.

The container has one end closed as at 12 and such closed end has an axial port 13, the inner end 14 of which defines a valve seat. The mouth 15 of the container is cylindrical as shown and the inner surface of the container adjacent the mouth 15 is threaded as at 16.

Positioned in the container 11 is a deformable partition illustratively in the form of an elongated bladder 23 of rubber or similar material having like characteristics, which divides the container 11 into two chambers C and Cl. The bladder 23 is closed at one end as at 24 and the mouth 25 of the bladder which is of greater thickness than the remaining portion of the bladder is secured as by molding to an annular supporting member 26 of rigid material, preferably of steel. By reason of the molding of the bladder 23 to the annular supporting member 26, the bladder 23 will be securely bonded to such supporting member 26.

In molding of the bladder 23, the end portion 30 of the thickened mouth 25 thereof is formed with a beveled inner periphery 31 so that it is substantially triangular in cross section having a rounded apex 32, said triangular end portion functioning as an O-ring as will hereinafter be described.

Figure 3:
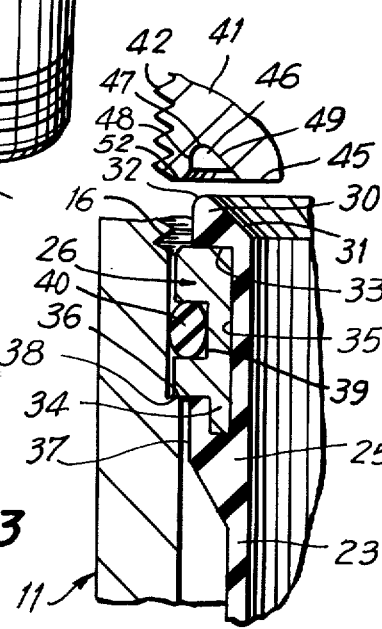
FIG. 3 is an exploded detail sectional view on an enlarged scale showing the sealing regions of the unit.

As is clearly shown in FIG. 3, the annular supporting member 26 is substantially rectangular in cross section, illustratively having a flat top wall 33 and an annular flange 34 depending from its flat inner surface 35.

It is to be noted that the transverse width of the annular supporting member is greater than that of the thickened rim 25 of the bladder as is clearly shown in FIG. 3, and the outer periphery 36 of the annular supporting member 26 will extend laterally outwardly of the outer periphery 37 of the thickened rim 25.

As is also clearly shown in FIG. 3, the inner diameter of the container is reduced to define an annular shoulder 38 which forms a seat for the outer periphery 36 of the annular supporting member 26 so that the bladder 23 will be dependably retained in desired position in the container.

The annular supporting member 26 has an annular groove 39 in its outer periphery in which an O-ring 40 is positioned, the function of the O-ring being to provide a seal.

In order to retain the annular supporting member 26 and bladder 23 in position, a cylindrical cover member 41 is provided. The cover member 41 is externally threaded as at 42 so that it may be screwed into threaded mouth 15 of the container by means of a spanner wrench (not shown) applied to conventional bores 43 in the top surface 44 of the cover member 41.

Figure 4:
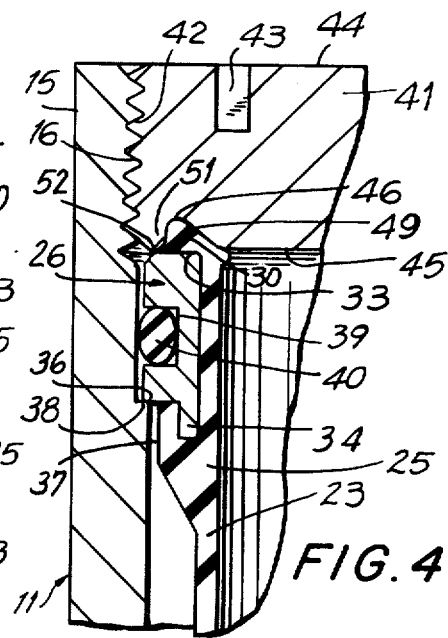
FIG. 4 is a detail sectional view showing the sealing regions of the unit in assembled position.

As is clearly shown in FIG. 4, the inner surface 45 of the cover member 41 is provided with an annular groove 46 adjacent the threaded outer periphery 42 of the cover member 41. The annular groove 46 is substantially triangular in configuration and is complementary to the triangular configuration of the end portion 30 of the thickened mouth 25 of the bladder 23.

Thus, the annular groove 46 has a rounded apex 47, a substantially cylindrical outer wall 48 and a beveled inner wall 49, the portion 51 of the cover member between the cylindrical wall 48 and the threaded outer periphery 42 defining a rim.

As is clearly shown in the drawings, when the cover member 41 is screwed into the container, the inner surface 52 of rim 51 will react against the flat top wall 33 of the annular supporting member 26 so that the outer periphery 36 of the annular supporting member 26 will be forced against its seat 38 securely to retain the annular supporting member in fixed position.

It is apparent that as the cover member 41 is screwed into position as above described, the triangular end portion 30 of the thickened mouth 25 of the bladder 23 will nest in the complementary annular groove 46 in the cover member which is of slightly smaller dimension than that of the end portion 30 with the result that the end portion 30 will be squeezed and hence a dependable seal will be formed, such end portion 30 thus functioning an an O-ring.

Consequently, two seals will be provided, one by the end portion 30 of the thickened mouth 25 of the bladder 23 which defines a seal for the compressed gas in chamber C and the other by the O-ring 40 which defines a seal for the oil under pressure in chamber C1.

It is to be noted that when the unit is assembled and the annular supporting member 26 with the bladder 23 secured thereto is inserted into the open mouth of the container since the periphery 37 of the thickened mouth 25 of the bladder is of outer diameter less than the inner diameter of the container 11, no rubbing will occur between the outer periphery 37 of the bladder mouth and the inner surface of the wall of the container.

As a result of such arrangement, precise tolerances in the manufacture of the container 11 and the bladder 23 are not required. If the thickened rim 25 of the bladder itself functioned as a seal it would have to be of outer diameter such as to press relatively tightly against the inner surface of the container. Consequently, if the inner diameter of the container was made slightly too small and the outer diameter of the thickened mouth of the bladder was slightly too large, as the annular supporting member with the bladder secured thereto was forced into the mouth of the container, injury to the bladder mouth could occur with resultant subsequent failure of the unit. This danger is of course completely avoided by the construction above described in which the outer diameter of the thickened mouth of the bladder is considerably less than the inner diameter of the container wall.

Since the seal between the outer periphery of the rigid annular supporting member and the inner surface of the container is afforded solely by the O-ring 40, it is apparent that the outer diameter of the annular supporting member may be such as compared to the inner diameter of the container so as to permit ready insertion of the annular supporting member into the container mouth so that its outer periphery 36 may readily seat on annular shoulder 38. The O-ring 40 is of course of diameter in cross section such that it may be squeezed sufficiently when the annular supporting member is inserted into the mouth of the container as to provide a dependable seal with respect to the inner surface of the container wall.

If by chance the cross sectional diameter or thickness of the O-ring should be too great, and it should be injured when it is inserted into the mouth of the container, such O-ring may readily be replaced and its cost is but a fraction of the cost of the bladder.

To complete the assembly, the cover member has an axial bore 61 in which a conventional gas charging valve 62 may be positioned.

Mounted on the closed end 24 of the bladder 23 and axially positioned with respect thereto is a valve member 64, illustratively in the form of a button, preferably formed from steel or aluminum.

The function of the valve member 64 is to move against the seat 14 when the bladder 23 is expanded in use to close the port 13 to prevent extrusion of the bladder through such port with resultant possibility of injury thereto.

With the construction above described of the bladder, i.e., the provision of the integral seal defined by the substantially triangular end portion 30 thereof which coacts with a complementary annular groove 46 in the cover member, the unit only requires one separate seal, i.e., the O-ring 40 to provide a completely sealed unit, i.e., a unit in which leakage of oil and gas from the oil chamber C1 and the gas chamber C is precluded, Such arrangement greatly reduces the cost of the unit and provides for highly dependable operation.

Having thus described my invention, what I claim as new and desire to secure by Letters Patent of the United States is:

1. A pressure vessel comprising a rigid hollow container having a cylindrical opening at one end defining the mouth of the container and having a port at its other end, a bladder of resilient deformable material in said container, said bladder having a mouth at one end and being closed at its other end and intervening between said opening and said port, annular shoulder means in said container wall, an annular supporting member of rigid material contacting said shoulder means and having a cylindrical outer periphery with an annular groove therein and a bottom surface to which the mouth of the bladder is bonded, said annular shoulder means releasably supporting said annular supporting member, an O-ring positioned in said annular groove to define a seal with respect to the adjacent wall surface of the container, the mouth of said bladder having a portion at the outer end thereof bonded to and extending longitudinally outward from the top surface of said annular supporting member and defining an annular sealing portion, a cover member having a port, said cover member being positioned in the cylindrical opening of said container, said cover member having an inner surface with an annular groove positioned slightly inwardly from the outer periphery of said cover member, the portion of the inner surface of said cover member between its outer periphery and said annular groove defining an annular rim, means releasably to retain said cover member in fixed position in said cylindrical opening with the annular rim abutting against the portion of the top surface of said annular supporting member outwardly of the sealing portion of the mouth of the bladder to retain said annular supporting member against said annular shoulder means, said sealing portion of said bladder being compressed between said supporting member and said cover member and accommodated in the annular groove in said cover member to define an annular seal, the entirety of said sealing portion of said bladder being located radially inwardly of said rim.

2. The combination set forth in claim 1 in which the cylindrical opening defining the mouth of the container is internally threaded and said cover member is a cylindrical disc having an externally threaded periphery to coact with the threaded mouth of the container releasably to retain the cover member in fixed position.

3. The combination set forth in claim 1 in which a portion of said container has a reduced inner diameter defining an annular shoulder which forms said mounting means and the outer periphery of said annular supporting member adjacent its bottom surface is seated on said shoulder.

4. The combination set forth in claim 1 in which the mouth of said bladder has a thickend portion, said annular supporting member is rectangular in cross section having a cylindrical inner periphery with a depending annular flange, the mouth of said bladder being bonded to the bottom surface of said annular supporting member and to said annular flange as well as to the inner surface of said annular supporting member, said annular sealing portion extending above the top surface of said annular supporting member and being bonded to such top surface with the outer periphery of said annular sealing portion being spaced inwardly from the outer periphery of said annular supporting member.

* * * * *